United States Patent
Das et al.

(10) Patent No.: US 9,301,238 B2
(45) Date of Patent: Mar. 29, 2016

(54) METHODS AND APPARATUS FOR AUTOMATED LOCAL NETWORK FORMATION USING ALTERNATE CONNECTED INTERFACES

(75) Inventors: Saumitra Mohan Das, San Jose, CA (US); Vidya Narayanan, San Diego, CA (US); Lakshminath Reddy Dondeti, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 711 days.

(21) Appl. No.: 12/717,629

(22) Filed: Mar. 4, 2010

(65) Prior Publication Data

US 2011/0010458 A1    Jan. 13, 2011

Related U.S. Application Data

(60) Provisional application No. 61/158,297, filed on Mar. 6, 2009, provisional application No. 61/181,544, filed on May 27, 2009.

(51) Int. Cl.
| | |
|---|---|
| *G06F 15/16* | (2006.01) |
| *H04W 48/08* | (2009.01) |
| *H04W 84/02* | (2009.01) |
| *H04W 84/18* | (2009.01) |

(52) U.S. Cl.
CPC .............. *H04W 48/08* (2013.01); *H04W 84/02* (2013.01); *H04W 84/18* (2013.01)

(58) Field of Classification Search
CPC .................. H04N 21/44222; H04N 21/44218
USPC ........ 709/226, 227, 228; 455/404.1, 420, 453
See application file for complete search history.

(56) References Cited

U.S. PATENT DOCUMENTS

| | | | | |
|---|---|---|---|---|
| 6,985,740 | B2 | 1/2006 | Shyy et al. | |
| 7,733,860 | B2* | 6/2010 | Coffell et al. | 370/392 |
| 7,945,666 | B2* | 5/2011 | Wunner | 709/225 |
| 8,301,135 | B2* | 10/2012 | Buckley et al. | 455/432.1 |
| 9,043,828 | B1* | 5/2015 | Jing | H04N 21/258 358/1.6 |

(Continued)

FOREIGN PATENT DOCUMENTS

| | | |
|---|---|---|
| CN | 1499773 A | 5/2004 |
| WO | WO 03071690 A2 | 8/2003 |
| WO | 2004080026 A1 | 9/2004 |

OTHER PUBLICATIONS

"Full-Text Federated Search in Peer-to-Peer Networks"—Jie Lu, Carnegie Mellon University, Oct. 2007 https://www.lti.cs.cmu.edu/sites/default/files/research/thesis/2007/jie_lu_full-text_federated_search_in_peer-to-peer_networks.pdf.*

(Continued)

Primary Examiner — Randy Scott

(57) ABSTRACT

The described apparatus and methods may include a local network formation module configured to join an overlay network via an available connection, retrieve from the overlay network at least one ad associated with forming a local network, determine if there is at least one matching ad to form the local network, and if no matching ads are determined, then publish an ad with a first local network configuration, or if one or more matching ads are determined, then join a local network according to a second local network configuration corresponding to one of the one or more matching ads.

31 Claims, 9 Drawing Sheets

(56) References Cited

U.S. PATENT DOCUMENTS

| | | | |
|---|---|---|---|
| 2006/0179310 A1* | 8/2006 | Zhang | 713/168 |
| 2007/0030824 A1 | 2/2007 | Ribaudo et al. | |
| 2007/0115844 A1* | 5/2007 | Basu | H04L 67/16 370/252 |
| 2007/0141988 A1 | 6/2007 | Kuehnel et al. | |
| 2007/0153707 A1 | 7/2007 | Thubert et al. | |
| 2008/0151806 A1 | 6/2008 | Bereski et al. | |
| 2008/0172491 A1 | 7/2008 | Chhabra et al. | |
| 2009/0011834 A1 | 1/2009 | Chhabra | |
| 2009/0054033 A1* | 2/2009 | Pratt et al. | 455/410 |

OTHER PUBLICATIONS

Eugster, P.T et al., "Location-based Publish/Subscribe", Proceedings of the 2005 Fourth IEEE International Symposium on Network Computing and Applications (NCA'05), 2005, pp. 279-282.
International Search Report—PCT/US2010/0026437, International Search Authority—European Patent Office—Jun. 1, 2010.
Taiwan Search Report—TW099106492—TIPO—Apr. 9, 2013.
Written Opinion—PCT/US2010/0026437, International Search Authority, European Patent Office, Jun. 7, 2010.

* cited by examiner

METHODS AND APPARATUS FOR AUTOMATED LOCAL NETWORK FORMATION USING ALTERNATE CONNECTED INTERFACES

CLAIM OF PRIORITY UNDER 35 U.S.C.§119

The present Application for Patent claims priority to Provisional Application No. 61/158,297 entitled "Methods and Apparatus for Automated Local Network Formation Using Alternate Connected Interfaces" filed Mar. 6, 2009, and assigned to the assignee hereof and hereby expressly incorporated by reference herein.

The present Application for Patent also claims priority to Provisional Application No. 61/181,544 entitled "Methods and Apparatus for Automated Local Network Formation Using Alternate Connected Interfaces" filed May 27, 2009, and assigned to the assignee hereof and hereby expressly incorporated by reference herein.

BACKGROUND

1. Field

The following description relates generally to wireless communications, and more particularly to automated formation of local networks using alternate connected interfaces.

2. Background

A network in which member nodes obtain services in the absence of server-based infrastructure is referred to as a "peer-to-peer" overlay network. In a peer-to-peer overlay, peer nodes co-operate with each other both to provide services and to maintain the network. Peer-to-peer overlay networks can be built on top of an underlying network that provides host to host connectivity, such as a network utilizing an Internet Protocol (IP). Examples of an overlay network include, but are not limited to, the Internet (e.g., overlay on a telephone network), Chord, Content Addressable Network (CAN), Pastry, and Viceroy. In general, nodes in an overlay may not all be able to communicate with each other pairwise. However, they may all communicate with one another via the overlay through multi-hop underlay routes.

Typically, when mobile devices participate in content sharing or collaborative applications, such as gaming or picture exchange, they form a network through a communication interface (e.g., Wireless Wide Area Network (WWAN)) that is connected to a common shared medium (e.g., the Internet). This approach, however, is inefficient in that it does not allow direct communication between mobile devices that are in close physical proximity to one another, but rather requires the devices to communicate across the Internet potentially over multiple IP hops and end hosts. Such communication can cause delays and increased power usage due to the use of cellular interfaces, and usually results in lower bandwidth and higher costs to the users.

However, problems exist when mobile devices that are either in range or out of range of one another attempt to form an ad hoc network. In this case, the mobile devices may be unable to decide on a common network configuration to establish a common network (i.e., on the same channel with the same parameters), and will typically form two separate ad hoc networks as a result of failing to locate one another.

Another problem with ad hoc network formation on a local level is establishing a network configuration. All devices are required to agree ahead of time on a certain network configuration, which is a difficult distributed problem to solve. In addition, such networks are formed based on physical proximity and hence agreement to form such networks may need to be done on a spatial basis.

Therefore, improvements in apparatus and methods of local network formation are desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect of the disclosure, a method of local network formation by a mobile device may include joining an overlay network via an available connection, retrieving from the overlay network at least one ad associated with forming a local network, determining if there is at least one matching ad to form the local network, and if no matching ads are determined, then publishing an ad with a first local network configuration, or if one or more matching ads are determined, then joining a local network according to a second local network configuration corresponding to one of the one or more matching ads.

According to another aspect of the disclosure, at least one processor configured for local network formation, may include a first module for joining an overlay network via an available connection, a second module for retrieving from the overlay network at least one ad associated with forming a local network, a third module for determining if there is at least one matching ad to form the local network, and a fourth module for publishing an ad with a first local network configuration if no matching ads are determined, or for joining a local network according to a second local network configuration corresponding to one of the one or more matching ads if one or more matching ads are determined.

According to a further aspect of the disclosure, a computer program product for local network formation may include a computer-readable medium including a first set of codes for causing a computer to join an overlay network via an available connection, a second set of codes for causing a computer to retrieve from the overlay network at least one ad associated with forming a local network, a second set of codes for causing a computer to determine if there is at least one matching ad to form the local network, and a fourth set of codes for causing the computer to publish an ad with a first local network configuration if no matching ads are determined, or to join a local network according to a second local network configuration corresponding to one of the one or more matching ads if one or more matching ads are determined.

According to yet a further aspect of the disclosure, a mobile device for local network formation may include means for joining an overlay network via an available connection, means for retrieving from the overlay network at least one ad associated with forming a local network, means for determining if there is at least one matching ad to form the local network, and means for publishing an ad with a first local network configuration if no matching ads are determined, or for joining a local network according to a second local network configuration corresponding to one of the one or more matching ads if one or more matching ads are determined.

According to yet a further aspect of the disclosure, a mobile device may include a memory including a local network formation component, and a processor in communication with the memory and configured to execute the local network formation component to join an overlay network via an available connection, retrieve from the overlay network at least one ad associated with forming a local network, determine if there is at least one matching ad to form the local network, and publish an ad with a first local network configuration if no matching ads are determined, or join a local network according to a second local network configuration corresponding to one of the one or more matching ads if one or more matching ads are determined.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
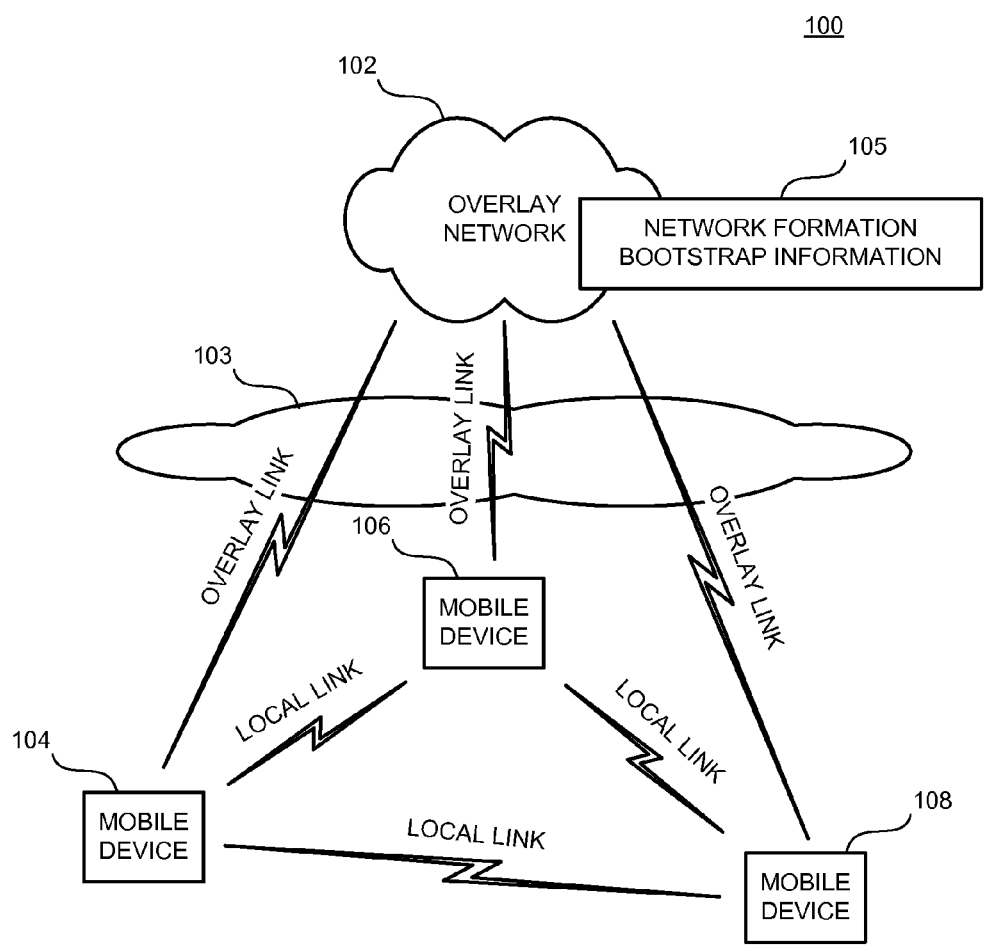
FIG. 1 is a block diagram of an aspect of a wireless communication system for local network formation using an overlay network.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described aspects use a rendezvous overlay network formed over a wide area interface to store bootstrap information to enable formation of a local network. The bootstrap information may be discovered by searching the rendezvous overlay network. For example, in an aspect, the devices connect to the overlay via a wide area connection to reach a consensus and enable local network formation. For instance, these aspects include providing parameters, such as a resource identifier, that may be used by any device looking to form an ad hoc local network. The resource identifier may be commonly known for use in ad hoc local network formation and may be a predetermined resource identifier.

The parameters may be provided to the mobile devices through publishing, advertising, or broadcasting within the overlay network. Some of the parameters that facilitate joining or forming the local network may be the resource identifier and location information. The parameters may be provided to the mobile devices in any type of form sufficient for ensuring that the mobile devices are able to receive and process the parameters to join or form the local network. For example, the various forms in which the parameters are provided may be an ad, advertisement, information record, network formation bootstrap information, and overlay configuration document.

A device may publish resource identifiers under various categories, such as "well-known name," "specific topic of interest," and other attributes associated with the "location." The location information may be expressed in multiple ways. For example, the location may be encoded as WGS84 global coordinates, geographic coordinates (e.g., latitude, longitude), local coordinates (x,y,z) with a unique location context identifier and origin point, the location may be POI-based, and may also be expressed in reference to another device. As such, any devices joining the overlay network via a wide area network connection can discover the existence of another device wishing to form an ad hoc local network by requesting a list of any advertised resource identifiers, and can then further determine if any such ads correspond to their respective location based on the location information associated with the ad. If a match is found, then a device establishes a local network using local network configuration data associated with the matching ad. It should be noted that matching of resource identifiers may be either exact or approximate (e.g., "fuzzy" matching). An exact match may be one where the resource identifiers are identically matched. Whereas an approximate match may be one where the resource identifiers are closely related and have a predetermined number of characters/numbers in common. For example, misspellings and closely related words may be considered a match.

If a device wishing to form an ad hoc local network joins the overlay network and discovers that no ads exist with the resource identifier, then the device can determine a local network configuration and publish an ad with the resource identifier, the location, and the local network configuration. As such, another device joining the network can discover the ad and have the opportunity to form an ad hoc local network with the first device.

Additional aspects include determining location matches when multiple ads having the resource identifier are found, and a technique that resolves a situation where two devices advertise the resource identifier simultaneously ("a race resolution technique").

FIG. 1 is a block diagram illustrating an example wireless communication system 100 for local network formation using an overlay network 102. The overlay network 102 may be a virtual network of nodes and logical links that utilizes an infrastructure of one or more underlying networks 103 to allow a subset of nodes, such as mobile devices 104, 106, 108, of the underlying network 103 to participate in the overlay network 102. The underlying network 103 may comprise any number or types of networks such as Wide Area Networks (WAN), Local Area Networks (LAN), wireless networks, or any other type of IP network. In an aspect, the overlay network 102 is a structured distributed network, such as a Distributed Hash Table (DHT)-based overlay network; however, the present system for local network formation is suitable for use with other types of wide area overlay networks, such as Gnutella, which is an unstructured overlay network. The overlay network 102 may be used to store local network formation bootstrap information 105 so as to enable the formation of a local network. Network formation bootstrap information 105 may be discovered by any one of the mobile devices 104, 106, 108 by searching the overlay network 102. It should also be noted that, although FIG. 1 shows only mobile devices 104, 106, 108, the system 100 may include any number of mobile devices.

In the system 100, mobile devices 104, 106, 108 may be connected to the overlay network 102 via overlay links The overlay links may be any type of links that facilitate long range communication and/or short range communication. For example, the overlay links may facilitate communication over WWAN, WLAN, WiFi, Bluetooth, Zigbee, etc. The overlay links may be used to advertise, discover, configure, and form local networks of various types.

Within the local network, the local links formed by mobile devices 104, 106, 108 may be any type of proximity based communication links, such as WLAN, WiFi, Bluetooth, and Zigbee, for example. The system 100, however, is not limited in this respect and may be applied to any pair of interfaces with the required characteristics of local link connectivity.

One example of such a type of local network may be a local IEEE 802.11 standard ad hoc WiFi network. Another example of such a type of local network may be a local IEEE 802.11 standard WiFi infrastructure network.

According to one aspect, the mobile devices 104, 106, 108 may be configured to form an ad hoc WiFi local network through the use of the already formed WWAN based overlay network 102 to perform distributed consensus in order to setup a WiFi based ad hoc network.

For example, mobile devices 104, 106, 108 may be in a local neighborhood and are configured to setup a WiFi ad hoc network to collaborate and share. Each of the mobile devices 104, 106, 108 may join the overlay network 102 using their overlay links (e.g., WWAN links) over the Internet. Mobile device 104 may initiate the WiFi ad hoc formation by publishing local network configuration parameters onto the overlay network 102, which may be a DHT-based overlay network, while simultaneously beaconing via a broadcast message the configuration parameters in the local area. Mobile stations 106 and 108 may detect the configuration information from the overlay network 102 based on the DHT, configure their respective WiFi interfaces accordingly, discover the ad hoc network initiated by the mobile device 104 by hearing the beaconed message, and join it. Other devices (not shown) may also join the same WiFi ad hoc network in a similar manner until all the devices in the local neighborhood are part of the same WiFi ad hoc network.

According to one aspect, there may be several parameters that the mobile devices 104, 106, 108, may need to agree on for the local network to function. These parameters may include, but are not limited to, one or any combination of the following: service set identifier (SSID); basic service set identifier (BSSID); channel frequency on which the communication takes place (Channel); modulation mode to be used; security credential information, such as a network key; and location.

Additional parameters may be added, such as a parameter that indicates the transmission power of a mobile device to indicate an extended communication range. For example, a device may be willing to extend the range of what it considers "local" by using more power in its transmissions. The modulation mode specifies the WiFi mode of operation which can take on various 802.11 values, such as 802.11a, 802.11b, 802.11g, and 802.11n, etc. This parameter may vary based on the local network being advertised and its associated standards.

The channel specifies the channel to be used for communication and, for example, may be specified in a frequency, such as MHz. The mobile station may check if the channel is appropriate for the mode chosen. For example, 802.11a should not have channels defined in the 2400 MHz range.

The location parameter may be an extended Uniform Resource Identifier for geographic locations (geoURI). If, for example, a wgs84 datum is specified, the coordinates refer to a latitude and longitude at which the local network routing optimization is to be specified. The location tag can also be an indoor location which is useful when an indoor location is available. The indoor location geoURI is of the format geo: <x coordinate in meters, y coordinate in meters, location context identifier>. The x, y coordinate is the indoor coordinate around which the local network routing optimization is to be triggered, and the location context identifier is a unique 128 bit GUID that refers to an indoor location, which is typically a specific floor or an area of a building.

The mobile device may define a predetermined radius (e.g., 300 ft) around the location coordinate contained in the local network advertisement, and if its own location is within that range, the mobile device may activate the ad hoc network on its WiFi interface. The mobile device may then assign a random private IP address to the ad hoc WiFi interface in a particular range (e.g., 169.254/16). The mobile device may also perform duplicate address detection, which is a well known technique for those knowledgeable in the art.

In one aspect, local networks may be formed with one or multiple mobile devices serving as relays to one, some, or all of the participants, thus extending the communication range within the local network.

The use of the already formed overlay network 102 allows the mobile devices 104, 106, 108 in the local network to correctly associate under a single SSID, BSSID, and channel. Having the same parameters provides the benefit of avoiding the problem for WiFi ad hoc network formation where two mobile stations set their respective BSSIDs differently because of being initially out of range of one another and form separate disconnected ad hoc networks with different BSSIDs.

In order to associate under the same parameters, the present aspects enable a mobile device to publish an overlay configuration document including the parameters to set up the WiFi ad hoc network. This allows other mobile devices that wish to join the WiFi ad hoc network to use the parameters specified in the overlay configuration document to attempt to reach the bootstrap peers directly in ad hoc mode, or first form the overlay via a WWAN reachable bootstrap peer and then attempt to route locally to overlay neighbors using the published configuration parameters.

In another way to associate under the same parameters, the described aspects enable the mobile device to publish ad hoc network configuration information in the overlay network 102 that is actually formed after being discovered on a wide area overlay. Specifically, once the overlay network is formed using the Internet connected link, any mobile device can decide to initiate the WiFi network formation by publishing an entry into the DHT structure of the overlay network 102. The entry may include information such as a resource identifier, as well as the following parameters: SSID, BSSID, mode, channel, security key, and location.

The benefit of publishing this information is that it provides distributed consensus. Any new mobile station that joins the overlay network 102 may lookup the resource identifier before trying to initiate an ad hoc network. A resource identifier may be a string (e.g., "WifiFormation") that has been hashed using some one way hash function to a number. This number may be used to route a message in the overlay network to the mobile station responsible for storing that resource identifier. This responsible mobile station may be the one whose node identifier is closest numerically to the resource identifier of the message. Specific overlays may define their own ownership rules for resource identifiers to node identifiers. If the new mobile station finds a resource identifier entry already existing, it should set the channel to that specified in the entry and use the SSID as well. As such, the new mobile station is able to listen for beacons so as to form the ad hoc network. If the BSSID used by the mobile device at the end of this process is not that which is specified in the entry, then this may indicate that the mobile device is out of range of any other device in the ad hoc WiFi network and it must not form its own network but continue retrying until it can detect beacons with the correct BSSID. It may also be possible to set the BSSID within the mobile device, in which case the BSSID in the entry retrieved from the DHT can be set for the mobile device to become part of the ad hoc WiFi network. The value stored may also include other information, such as a shared key to secure the ad hoc WiFi network communication.

It should be noted that there may be multiple values specified in a form of a list for the resource identifier. The mobile device may choose one value that matches its location the best, or in the absence of location information, try each configuration according to a predefined order or based on the current size of each of the overlays. Size estimation can be done in overlays and added to the advertisement as an optimization. This ensures that the mobile station can choose the most useful overlay with likely the most services. For example there may be multiple overlays advertised in the same mall.

The mobile device may cache the values for the resource identifier so that when the mobile device has moved and its current location matches a different location it can enable a different set of configuration parameters that have been set for that location.

The mobile device may also initiate the distributed consensus by storing a value with configuration parameters at the particular resource identifier if it fails to find any configuration information for its own location.

It should also be noted that if the only resource identifier value stored is without location information, each mobile station may try connecting with the stored parameters regardless of the location.

In the manner described above, the mobile devices 104, 106, 108 may use the overlay network 102 to correctly configure their WiFi interfaces and form a functional local WiFi ad hoc network.

According to another aspect, the mobile devices 104, 106, 108 may be configured to form local connections over a WiFi infrastructure network. As such, the mobile devices 104, 106, 108 may use the already formed WWAN based overlay network 102 to provide information about available local infrastructure WiFi networks for a mobile device to use for local communication. The parameters that may be used and agreed upon by the mobile devices 104, 106, 108, may be similar to those in forming the ad hoc WiFi network. These parameters may include, but are not limited to, one or any combination of: SSID; BSSID; security credential information, such as a network key; and location.

Similar to the configuration information for the formation of the ad hoc WiFi network, the configuration information for the formation of local connections over the WiFi infrastructure network may be tagged with the location at which the configuration should be triggered (e.g., within a radius of 300 ft), and be published as part of an overlay configuration document or as a specific resource identifier in the overlay network 102.

The mobile device enabling such network routing optimization via the infrastructure WiFi may annotate additional information, such as the type of encryption and the security key to be used. The mobile device may specify multiple configuration parameters, which can be tagged with location information.

For example, in the case of a large conference, an overlay of all participants may be formed. However, either the overlay configuration document or the resource identifier can specify a list of values each for a different room in the conference tagged with a location. An overlay participant may match its location to one of the values to trigger and associate with the WiFi access point (AP) and attempt to optimize its current connections using local communication.

It should be noted that each advertisement on a resource identifier may contain a unique key that is generated by the mobile device storing the advertisement. The key may transfer directly into the value being stored or the key for the value if the overlay supports it. In an aspect, for example, the key may be a randomly generated 128-bit number. It should be noted that this key is different from a resource identifier.

Figure 2:
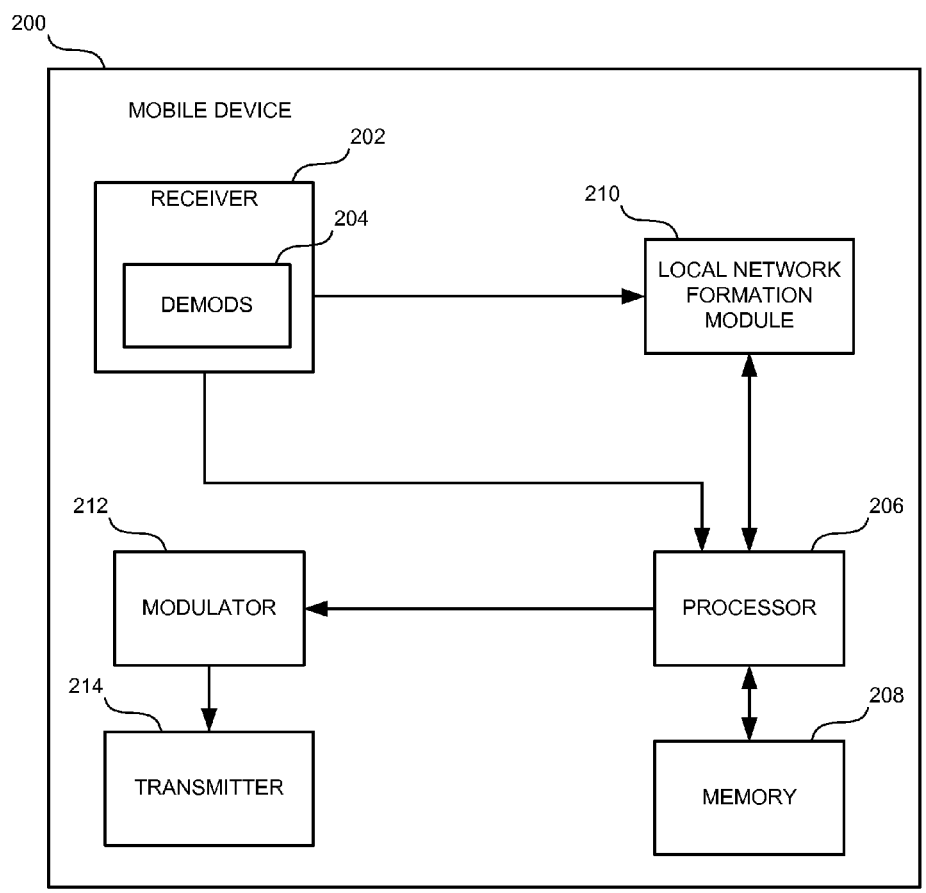
FIG. 2 is a block diagram of an aspect of a mobile device that facilitates local network formation using an overlay network.

FIG. 2 is an illustration of a mobile device 200 that facilitates local network formation using an overlay network. The mobile device 200 may correspond to the mobile devices 104, 106, 108 shown in FIG. 1. As shown in FIG. 2, the mobile device 200 may include a receiver 202 that receives multiple signals from, for instance, one or more receive antennas (not shown), performs typical actions (e.g., filters, amplifies, downconverts, etc.) on the received signals, and digitizes the conditioned signals to obtain samples. The receiver 202 may include a plurality of demodulators 204 that can demodulate received symbols from each signal and provide them to a processor 206 for channel estimation, as described herein. The processor 206 can be a processor dedicated to analyzing information received by the receiver 202 and/or generating information for transmission by a transmitter 216, a processor that controls one or more components of mobile device 200, and/or a processor that both analyzes information received by the receiver 202, generates information for transmission by the transmitter 216, and controls one or more components of the mobile device 700.

The mobile device 200 may additionally include memory 208 that is operatively coupled to the processor 206 and that can store data to be transmitted, received data, information related to available channels, data associated with analyzed signal and/or interference strength, information related to an assigned channel, power, rate, or the like, and any other suitable information for estimating a channel and communicating via the channel. Memory 208 can additionally store protocols and/or algorithms associated with estimating and/or utilizing a channel (e.g., performance based, capacity based, etc.).

It will be appreciated that the data store or memory 208 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 208 of the subject systems and methods is intended to comprise, without being limited to, these and any other suitable types of memory.

The receiver 202 can further be operatively coupled to a local network formation (LNF) module 210 that can facilitate the formation of local networks via the overlay network 102 by retrieving information records, transmitting ad requests, receiving ad responses, determining if the ad responses include any matching ads, or if there are any matching information records for forming a local network, and performing various other actions described herein based on the determination. The LNF module 210 may further control the acquisition and storage in memory 208 of parameters and other configuration information for network formation. Mobile device 200 can further comprise a modulator 212 that modulates and transmits signals via transmitter 214 to, for instance, a base station, a web/internet access point name (APN), and other mobile devices, etc. Although depicted as being separate from the processor 206, it is to be appreciated that the LNF module 210, demodulators 204, and/or modulator 212 can be part of the processor 206 or multiple processors (not shown). Furthermore, the functions of the LNF module 210 may be integrated in an application layer, a data stack, an HTTP stack, at the operating system (OS) level, in an internet browser application, an executable code or instructions stored in memory, or in an application specific integrated circuit (ASIC).

Figure 3:
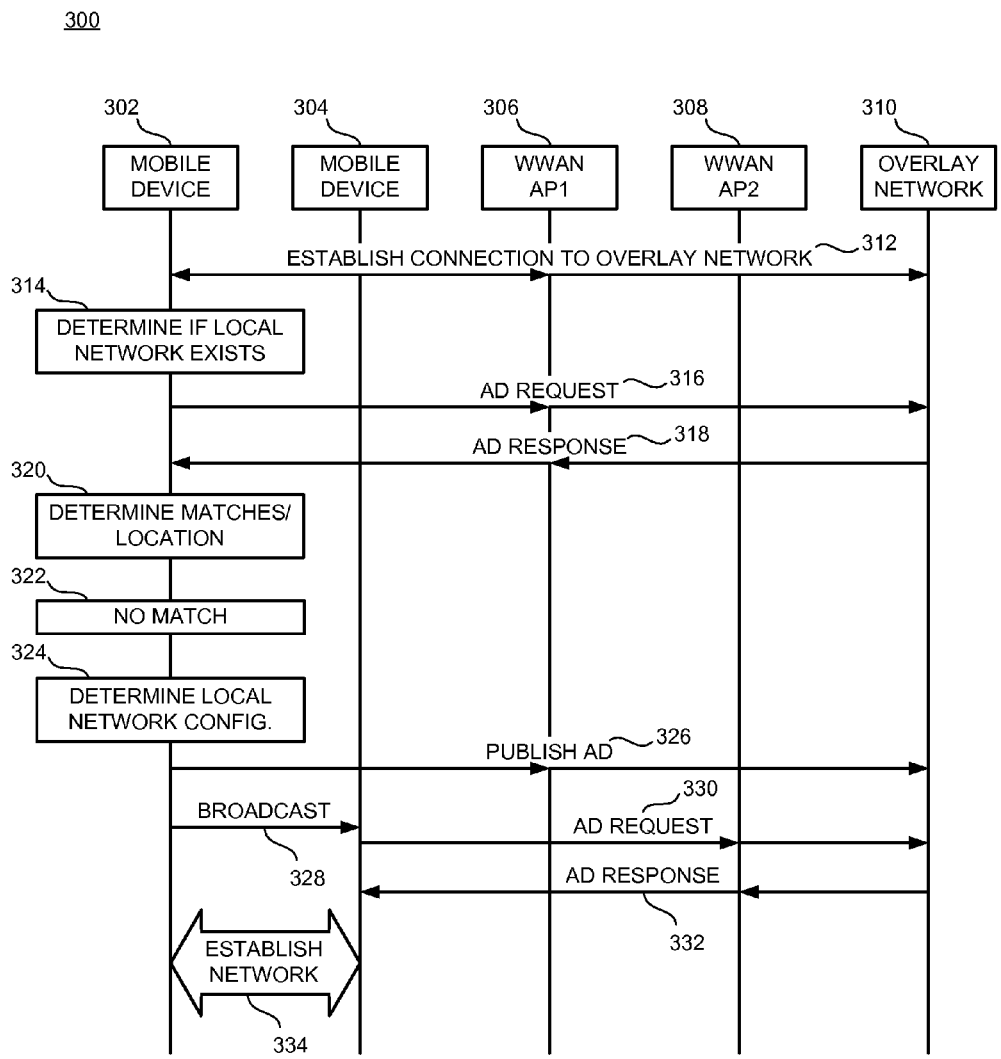
FIG. 3 is a flow diagram of an aspect of an operation of a wireless communication system for local network formation using an overlay network.

FIG. 3 is a flow diagram illustrating an example operation of a wireless communication system 300 for local network formation using an overlay network 310. In this example, mobile device 302, mobile device 304, WWAN access point (AP1) 306, WWAN AP2 308, and overlay network 310 are used for illustration purposes, and may correspond to previously described elements. For example, mobile device 302, mobile device 304, and overlay network 310 may correspond to mobile device 104, mobile device 106, and overlay network 102 of FIG. 1, respectively.

As shown in FIG. 3, when mobile device 302 activates a local network formation (LNF) module, such as the LNF module 210 shown in FIG. 2, to optimize network connections of an overlay, it may first establish connection to overlay network 310 (312) via the WWAN AP1. While establishing connection with the overlay network 310, the LNF module may first look up a policy file that lists a set of local network types with the order in which to try them for local network formation. For example, WiFi ad hoc may be listed first, followed by Bluetooth, followed by WiFi infrastructure, and some other local network technology. This policy file may be per overlay or a global one for the mobile device 302. The policy file may also list resource identifiers for looking up local network configuration parameters for each interface technology. The mobile device 302 may then check to see if it is actively participating in the overlay network 310 and determine at block 314 if a local network exists. If the mobile device 302 determines that it has not yet formed a local network, it may retrieve an information record specifying the resource identifier associated with forming an ad hoc local network. In one aspect, the information record may have already been retrieved from the overlay network 310 when the mobile device 302 established connection with the overlay network 310, and stored in the memory 208 of the mobile device 302. In that case, the information record may be retrieved from the memory 208. Otherwise, if the information record is not stored in the memory 208, then the mobile device 302 may retrieve the information record from the overlay network 310 via the WWAN AP1 306. In order to retrieve the information record form the overlay network 310, the mobile device 302 may transmit an ad request (316) to the overlay network 310 via the WWAN AP1 306 specifying a resource identifier associated with forming an ad hoc local network. The node (e.g., mobile station) responsible for storing the resource identifier of the ad in the overlay network 310 may transmit an ad response (318) to the mobile device 302 via the WWAN AP1 306 identifying whether or not any ads in the overlay network 310 have a resource identifier matching the resource identifier of the mobile device 302. Upon receipt of the ad response, the mobile device 302 may perform a resource identifier check and determine at block 320 if the ad response includes any matching ads having a resource identifier matching the resource identifier of the mobile device 302.

In the example shown in FIG. 3, the mobile device 302 determines that the ad response does not include any matching ads at block 322. The mobile device 302 may then publish (326) an advertisement including a local network configuration for the appropriate interface technology. The publication is made to the overlay network 310 via the WWAN AP1 306. For a WiFi ad hoc type of network, the local network configuration may include one or more parameters such as the SSID, BSSID, channel, mode, security credential information, and location. The mobile device 302 may also transmit a periodic broadcast (328), which may be received by the mobile device 304. This broadcast may be a periodically transmitted (e.g., every 30 seconds) user datagram protocol (UDP) packet sent over the local interface to a broadcast address, and may include information such as a name of the overlay network and a key corresponding to the published ad.

A race condition may occur if two mobile stations simultaneously advertise for the same location. At the same time, both of the mobile stations may observe the resource identifier with no values and decide to advertise a local network configuration. If both devices advertise the same configuration, the issue is resolved because the local network can still be formed. However, if the devices advertise different configurations (e.g., different channels), local network formation may be disrupted. To solve this issue, after initial advertisement, the LNF of the mobile device 302 may obtain the resource identifier again after a predetermined amount of time (e.g., 30 seconds). This period of time may be sufficient for a new mobile device to have sent an advertisement. At this time, the mobile device that advertised earlier may notice the advertisement from the mobile device that advertised later. In an aspect, a tie breaker mechanism in the LNF module directs a mobile device to choose one of the advertised local network, such as a latest advertised local network. In this case, for example, both mobile devices may now agree to use the latest, e.g. the second, advertised configuration. As new mobile devices enter the location, they may detect the advertised configuration and choose the latest configuration as well. The mobile device whose advertisement is the latest may refresh the configuration advertisement until it leaves the network. The refresh rate may be such that the advertisement should never be more than a predetermined amount of time (e.g., 600 seconds) away from expiry. In an aspect, for example, this predetermined amount of time may be determined by the lifetimes allowed for values stored in the overlay network 310 from the overlay configuration document.

If a mobile device, whose advertisement is being followed by other mobile devices within the local network, leaves the network and the configuration entry times out, the following procedure may be implemented. The LNF of the mobile device may track the state of a functional local network and issue a retrieval of the resource identifier at a random time (e.g., between 100-300 seconds) prior to expiry. If the advertisement has an expiry time less than a certain period (e.g., 600 seconds), then the LNF may determine that this situation indicates that the advertising mobile station has left the network. A mobile device that notices this situation may replace the advertisement with its own advertisement and use the same configuration currently being used by itself, which is the same as that of the advertisement that is about to be timed out. It should be noted that the random time of checking for expiry ensures that not all mobile devices may see an advertisement that is about to expire, however, even if all mobile devices do see an advertisement that is about to expire, the described aspects direct all of the device to advertise with the same parameters so that the local network remains operational.

As shown in FIG. 3, the mobile device 304, upon detection of the broadcast from the mobile device 302, may transmit an ad request (330) to the overlay network 310 via the WWAN AP2 308. The overlay network 310 may transmit an ad response (332) to the mobile device 304 via the WWAN AP2 308 identifying the configuration information published by the mobile device 302. Once the mobile device 304 matches the configuration information broadcasted by the mobile device 302 and the configuration information received from the overlay network 310, the mobile devices 302 and 304 establish a local network based on the configuration information.

Figure 4:
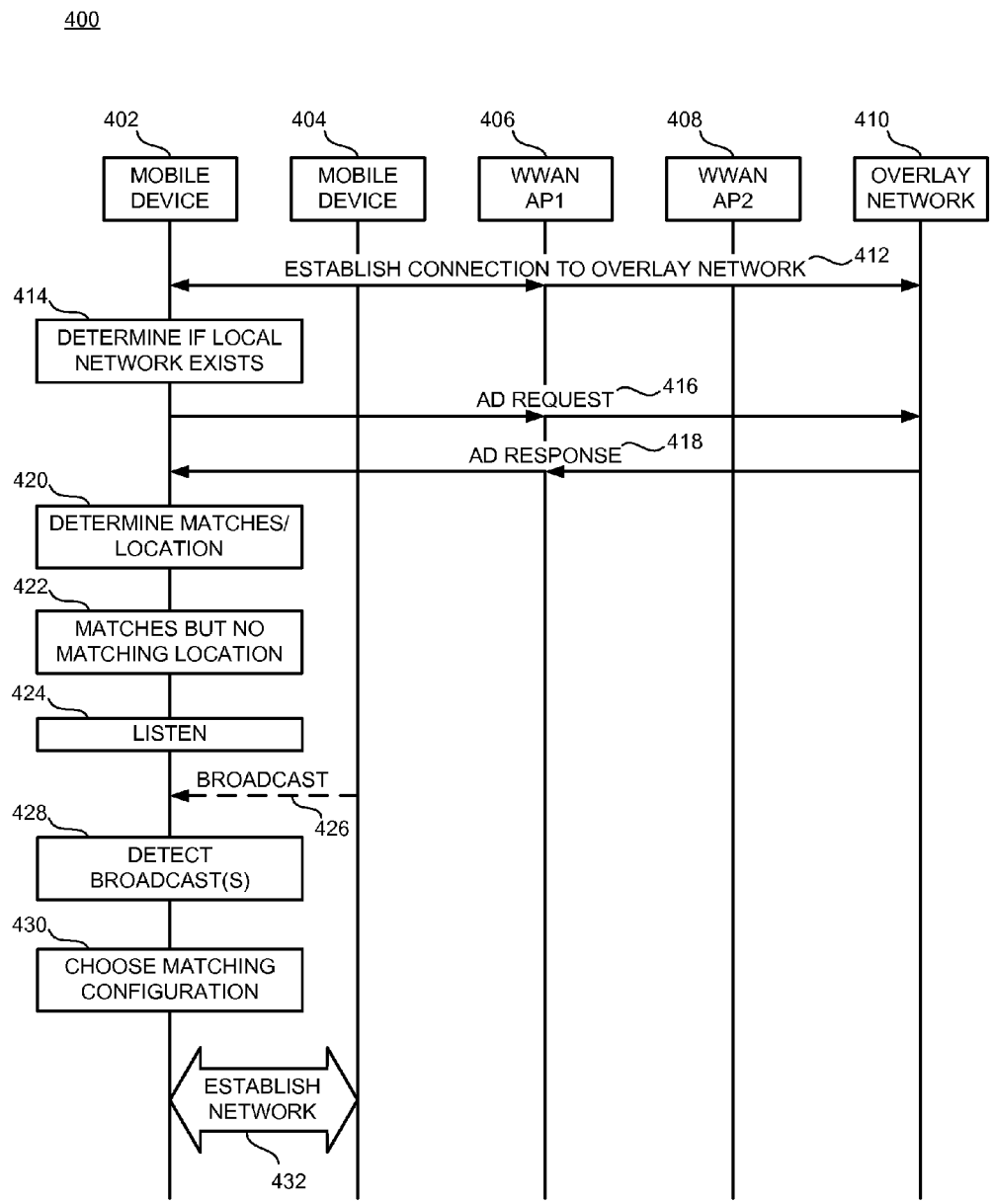
FIG. 4 is a flow diagram of another aspect of an operation of a wireless communication system for local network formation using an overlay network.

FIG. 4 is a flow diagram illustrating another example operation of a wireless communication system 400 for local network formation using an overlay network 410. It should be noted that mobile device 402, mobile device 404, WWAN AP1 406, WWAN AP2 408, overlay network 410, and flow elements 412, 414, 416, 418, and 420 of FIG. 4 correspond to mobile device 302, mobile device 304, WWAN AP1 306, WWAN AP2 308, overlay network 310, and flow elements 312, 314, 316, 318, and 320 of FIG. 3, respectively, and as such, their description will be omitted.

In the example shown in FIG. 4, the mobile device 402, at block 422, determines that the ad response includes matching ads, but that the ad location information associated with each matching ad does not correspond to location information of the mobile device 402. In other words, the position or geographic location of the mobile device 402 does not match with the position or geographic location corresponding to the matching ad. The mobile device 402 may then activate a listening mode at block 424 and attempt to listen for beacons, iterating over all the channels. While listening for beacons, the mobile device 402, at block 428, may receive on a specific channel a broadcast beacon that includes an overlay name and a key identifying an ad. This broadcast beacon may be from the mobile device 404. In block 430, the mobile device 402 may then determine that the broadcast beacon includes a network configuration that matches to one of the matching ads based on the key. The mobile device 402 may then, at block 432, establish a local network with the mobile device 404 based on the matching local network configuration.

Figure 5:
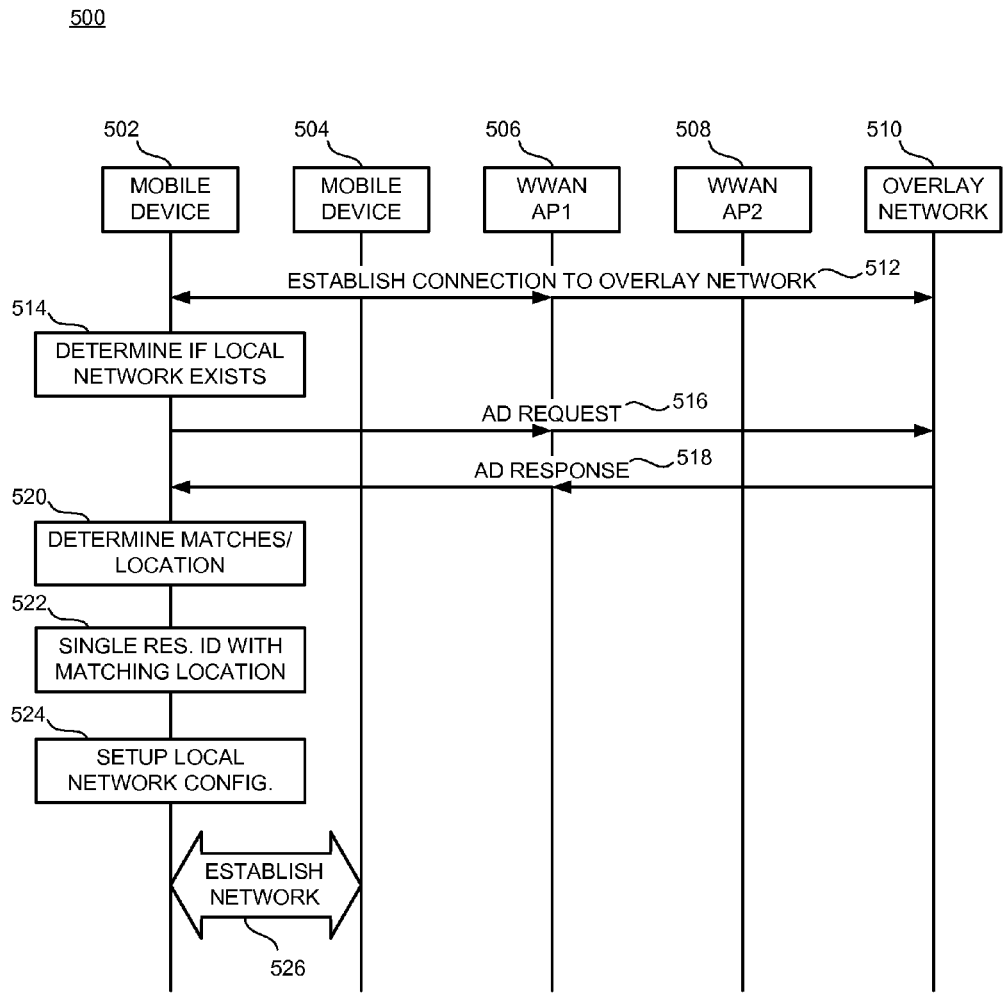
FIG. 5 is a flow diagram of another aspect of an operation of a wireless communication system for local network formation using an overlay network.

FIG. 5 is a flow diagram illustrating a further example operation of a wireless communication system 500 for local network formation using an overlay network 510. It should be noted that mobile device 502, mobile device 504, WWAN AP1 506, WWAN AP2 508, overlay network 510, and flow elements 512, 514, 516, 518, and 520 of FIG. 5 correspond to mobile device 302, mobile device 304, WWAN AP1 306, WWAN AP2 308, overlay network 310, and flow elements 312, 314, 316, 318, and 320 of FIG. 3, respectively, and as such, their description will be omitted.

In the example shown in FIG. 5, the mobile device 502, at block 522, determines that the ad response includes a single matching ad with a matching location. The mobile device 502, at block 524, may then setup the local network interface with the matching local network configuration. Once the setup is complete, the mobile device 502 may then, at block 526, establish a local network with the mobile device 504 based on the matching local network configuration.

Figure 6:
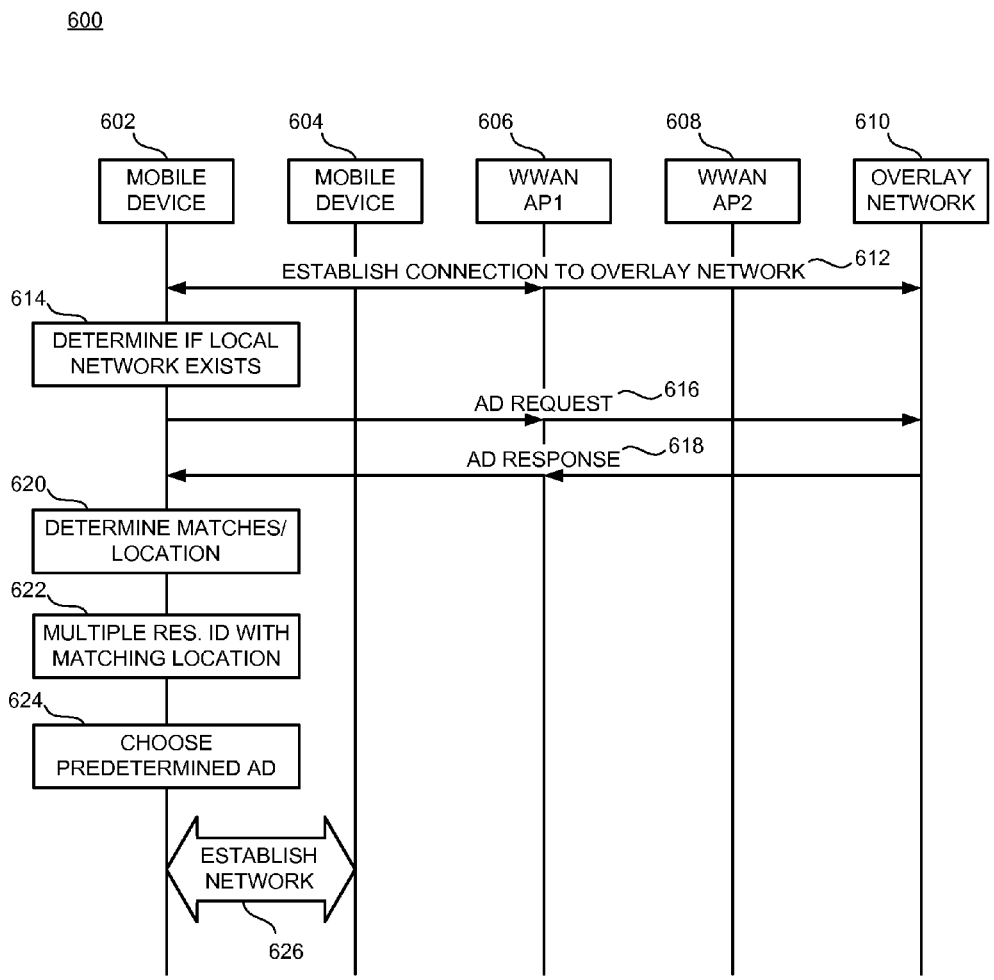
FIG. 6 is a flow diagram of another aspect of an operation of a wireless communication system for local network formation using an overlay network.

FIG. 6 is a flow diagram illustrating yet a further example operation of a wireless communication system 600 for local network formation using an overlay network 610. It should be noted that mobile device 602, mobile device 604, WWAN AP1 606, WWAN AP2 608, overlay network 610, and flow elements 612, 614, 616, 618, and 620 of FIG. 6 correspond to mobile device 302, mobile device 304, WWAN AP1 306, WWAN AP2 308, overlay network 310, and flow elements 312, 314, 316, 318, and 320 of FIG. 3, respectively, and as such, their description will be omitted.

In the example shown in FIG. 6, the mobile device 602, at block 622, determines that the ad response includes matching ads with multiple matching locations. The mobile device 602, at block 624, may then choose one of the ads based on a rule, such as choosing the latest ad, and setup the local network interface with the chosen matching local network configuration. Once the setup is complete, the mobile device 602 may then, at block 626, establish a local network with the mobile device 604 based on the matching local network configuration.

Figure 7:
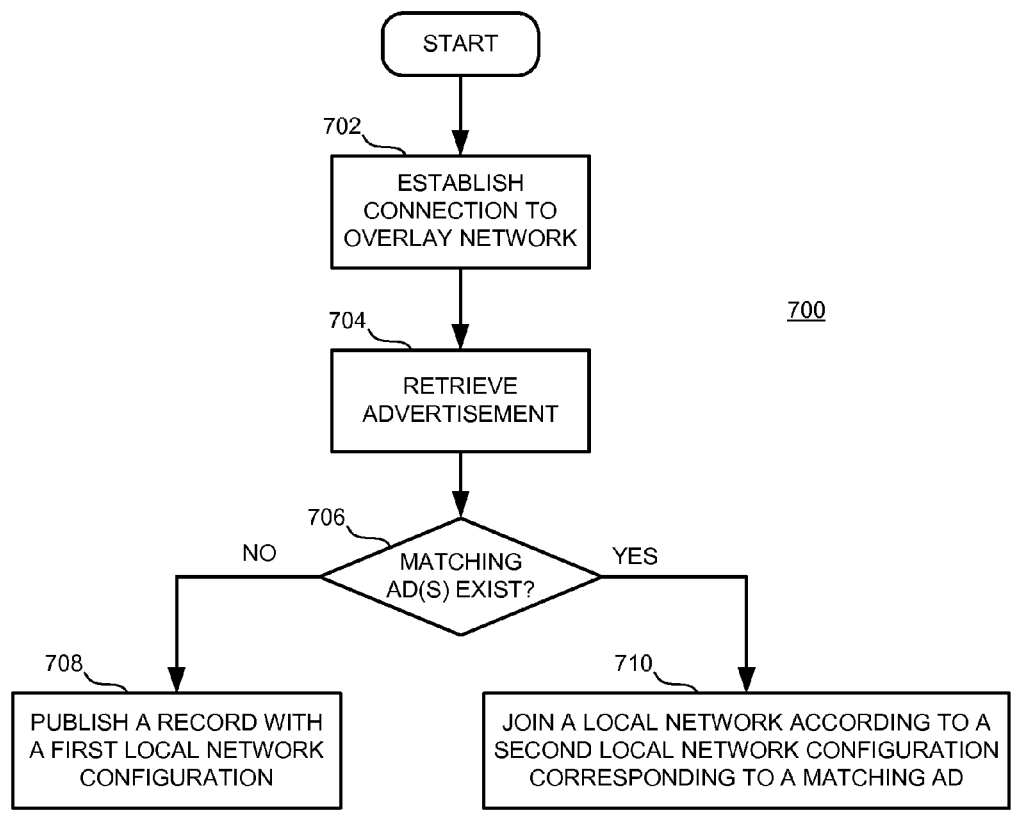
FIG. 7 is a flow chart of an aspect of a process for local network formation using an overlay network.

An example of a preferred network formation process 700, which may be implemented in system 100 and one or all of mobile devices 104, 106, 108, and their respective LNF modules, will now be described with reference to the flow chart illustrated in FIG. 7. As shown in FIG. 7, in block 702, connection is established to an overlay network via an available connection, and the process proceeds to block 704.

In block 704, at least one ad associated with forming a local network is retrieved from the overlay network, and the process proceeds to block 706.

In block 706, a determination is made as to whether there is at least one matching ad to form the local network. If no matching ads are determined, then, at block 708, an ad with a first local network configuration is published. If one or more matching ads are determined, then, at block 710, a local network is joined according to a second local network configuration corresponding to one of the one or more matching ads. Aspects of FIG. 7 will be described in more detail below with respect to FIG. 8.

Figure 8:
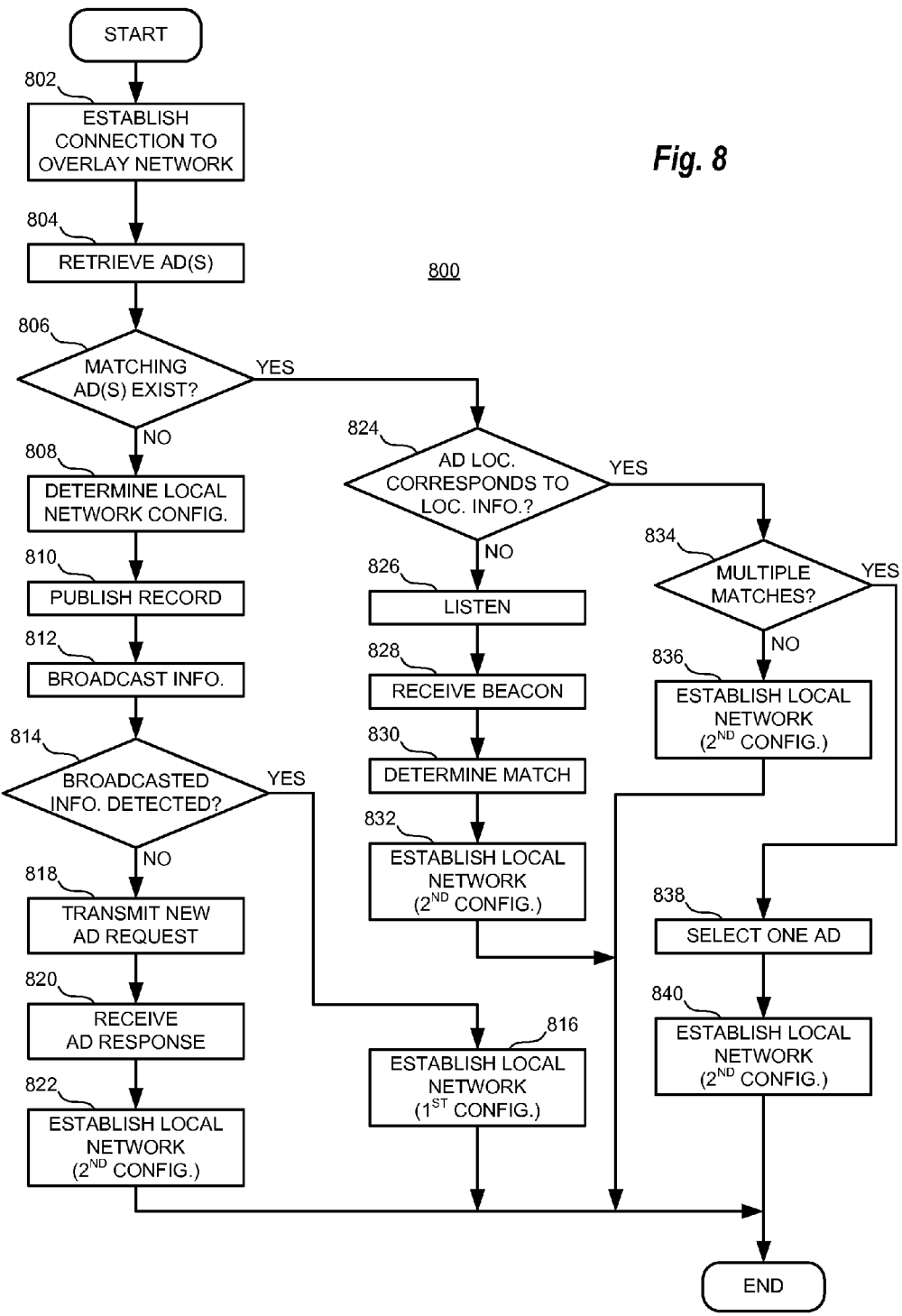
FIG. 8 is a flow chart of another aspect of the process of FIG. 7.

An example of a preferred network formation process 800, which may be implemented in system 100 and one or all of mobile devices 104, 106, 108, and their respective LNF modules, will now be described with reference to the flow chart illustrated in FIG. 8. In FIG. 8, blocks 802, 804, and 806 correspond to blocks 702, 704, and 706 of FIG. 7, respectively, and as such, their description will be omitted.

As shown in FIG. 8, in block 806, a determination is made as to whether there is at least one matching ad to form the local network. If no matching ads are determined, then the process proceeds to block 808. Otherwise, the process proceeds to block 824.

In block 808, a first local network configuration is determined, and the process proceeds to block 810. In block 810, an ad with the first local network configuration is published, and the process proceeds to block 812. In block 812, information including a name of the overlay network and a key corresponding to the published ad is periodically broadcasted, and the process proceeds to block 814.

In block 814, a determination is made as to whether the broadcasted information was detected by another mobile device. If the broadcast was detected, then the process proceeds to block 816. If the broadcast was not detected, then the process proceeds to block 818. In block 816, a local network over a local area interface according to the first local network configuration is established, and the process may end.

In block 818, a new ad request may be transmitted to the overlay network for the resource identifier at a predetermined time period after an initial broadcasting of the beacon is transmitted, and the process proceeds to block 820.

In block 820, a response to the new ad request identifying a new ad corresponding to the resource is received, and the process proceeds to block 822. In block 822, a local network over a local area interface based on the second local network configuration corresponding to the new ad is established, and the process may end.

In block 824, a determination is made as to whether ad location information associated with each matching ad corresponds to location information of the mobile device to define a matching location. If no matching location is found, then the process proceeds to block 826. If a matching location is found, then the process proceeds to block 834.

In block 826, a listening mode is activated, and the process proceeds to block 828. In block 828, a broadcast beacon including an overlay name and a key identifying an ad is received, and the process proceeds to block 830. In block 830, it is determined that the broadcast beacon matches to one of the matching ads based on the key, and the process proceeds to block 832. In block 832, a local network over a local area interface based on the second local network configuration corresponding to the ad that matches the key corresponding to the broadcast beacon is established, and the process may end.

In block 834, a determination is made as to whether multiple matching ads are determined. If multiple matching ads are determined, then the process proceeds to block 838. If a single matching ad is determined, then the process proceeds to block 836.

In block 836, a local network over a local area interface based on the second local network configuration corresponding to the ad having the matching location information is established, and the process may end.

In block 838, one of the ads having the matching location information according to a rule and having a newest advertised value is selected, and the process proceeds to block 840. In block 840, a local network over a local area interface based on the second local network configuration corresponding to the selected one of the ads having the matching location information is established, and the process may end.

Figure 9:
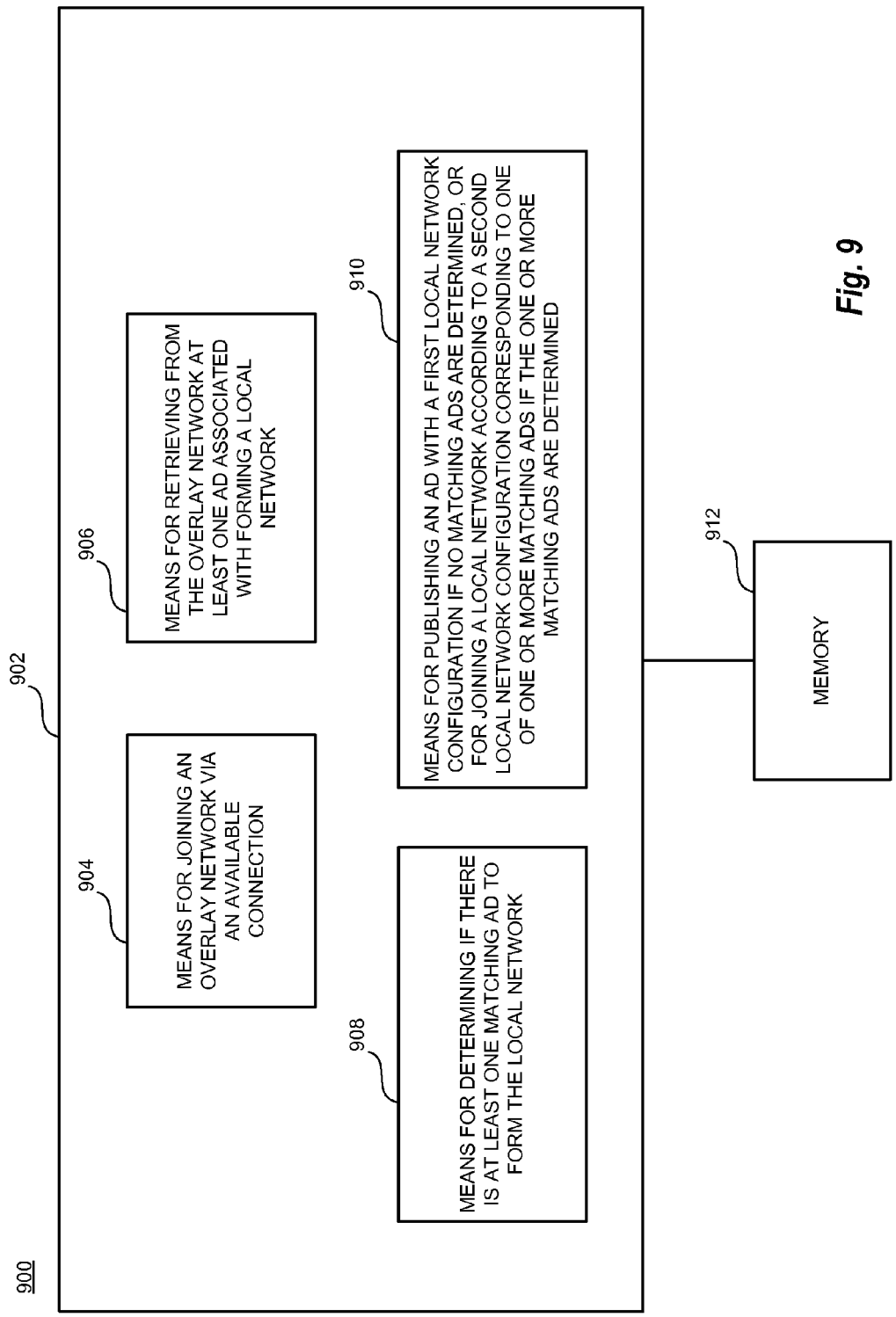
FIG. 9 is a block diagram of an aspect of a system that performs local network formation using an overlay network.

FIG. 9 is an illustration of an example system 900 that performs local network formation using an overlay network. For example, system 900 can reside at least partially within the LNF module 210 of the mobile device 200. It is to be appreciated that system 900 is represented as including functional blocks, which can be functional blocks that represent functions implemented by a processor, software, or combination thereof (e.g., firmware). System 900 includes a logical grouping 902 of means that can act in conjunction. For instance, logical grouping 902 can include: means for joining an overlay network via an available connection 904; means for retrieving from the overlay network at least one ad associated with forming a local network 906; means for determining if there is at least one matching ad to form the local network 908; means for publishing an ad with a first local network configuration if no matching ads are determined, and for joining a local network according to a second local network configuration corresponding to one of the one or more matching ads if one or more matching ads are determined 910. Additionally, system 900 can include a memory 912 that retains instructions for executing functions associated with the means 904 through 910. While shown as being external to memory 912, it is to be understood that one or more of the means 904 through 910 can exist within memory 912.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM , etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features are presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Additionally, as used herein, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be non-transitory, and which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of local network formation by a mobile device, comprising:
   joining an overlay network via an available connection;
   retrieving from the overlay network at least one ad associated with forming a local network;
   determining if there is at least one matching ad to form the local network;
   if no matching ads are determined, then publishing, by the mobile device, an ad with a first local network configuration to the overlay network via a Wireless Wide Area Network (WWAN) access point; and
   if one or more matching ads are determined, then joining a local network according to a second local network configuration corresponding to one of the one or more matching ads.

2. The method of claim 1, wherein if no matching ads are determined, further comprising periodically broadcasting information including a name of the overlay network and a key corresponding to the published ad.

3. The method of claim 2, further comprising establishing a local network over a local area interface according to the first local network configuration based on a second mobile device detecting the broadcast.

4. The method of claim 2, further comprising:
submitting a new ad request to the overlay network for the resource identifier at a predetermined time period after an initial broadcasting of the beacon;
receiving a response to the new ad request identifying a new ad corresponding to the resource; and
establishing a local network over a local area interface based on the second local network configuration corresponding to the new ad.

5. The method of claim 1, wherein if one or more matching ads are determined, then further comprising:
determining if ad location information associated with each matching ad corresponds to location information of the mobile device to define a matching location;
if no matching location is found, then:
activating a listening mode;
receiving a broadcast beacon in the listening mode, wherein the broadcast beacon includes an overlay name and a key identifying an ad;
determining if the broadcast beacon matches to one of the matching ads based on the key; and
establishing a local network over a local area interface based on the second local network configuration corresponding to the ad that matches the key corresponding to the broadcast beacon.

6. The method of claim 1, wherein if a single matching ad is determined, then further comprising:
determining if ad location information associated with the matching ad corresponds to location information of the mobile device to define a matching location; and
if a matching location is found, then:
establishing a local network over a local area interface based on the second local network configuration corresponding to the ad having the matching location information.

7. The method of claim 1, wherein if one or more matching ads are determined, then further comprising:
determining if ad location information associated with each matching ad corresponds to location information of the mobile device to define a matching location; and
if a plurality of matching locations are found, then:
selecting one of the ads having the matching location information according to a rule; and
establishing a local network over a local area interface based on the second local network configuration corresponding to the selected one of the ads having the matching location information.

8. The method of claim 7, wherein selecting one of the ads according to the rule further comprises choosing a respective ad having a newest advertised value.

9. The method of claim 1, wherein at least one of the first local network configuration or the second local network configuration further comprises at least one of an SSID, a BSID, a channel, a location, and a key.

10. The method of claim 1, wherein the ads are published using a known resource identifier.

11. The method of claim 1, wherein the ads include location parameters associated with a corresponding local network configuration.

12. The method of claim 1, wherein the ads are determined as matching when resource identifiers in the matching ads are not an exact match.

13. The method of claim 1, wherein the local network includes a mobile device acting as a relay for at least one other mobile device within the local network.

14. The method of claim 13, wherein the relay extends a communication range of the mobile devices within the local network.

15. A mobile device for local network formation, comprising:
a memory;
a processor communicatively coupled to the memory;
a first hardware module for joining an overlay network via an available connection;
a second module for retrieving from the overlay network at least one ad associated with forming a local network;
a third module for determining if there is at least one matching ad to form the local network;
a fourth module for publishing, by the mobile device, an ad with a first local network configuration to the overlay network via a Wireless Wide Area Network (WWAN) access point if no matching ads are determined; and
a fifth module for joining a local network according to a second local network configuration corresponding to one of the one or more matching ads if one or more matching ads are determined;
wherein the processor and the memory are configured to execute the first hardware module, the second module, the third module, the fourth module, and the fifth module.

16. A non-transitory computer-readable medium for local network formation by a mobile device, comprising:
a first set of codes for causing a computer to join an overlay network via an available connection;
a second set of codes for causing a computer to retrieve from the overlay network at least one ad associated with forming a local network;
a third set of codes for causing a computer to determine if there is at least one matching ad to form the local network;
a fourth set of codes for causing the computer to publish, by the mobile device, an ad with a first local network configuration to the overlay network via a Wireless Wide Area Network (WWAN) access point if no matching ads are determined; and
a fifth set of codes for causing the computer to join a local network according to a second local network configuration corresponding to one of the one or more matching ads if one or more matching ads are determined.

17. A mobile device for local network formation, comprising:
first means for:
joining an overlay network via an available connection;
retrieving from the overlay network at least one ad associated with forming a local network;
determining if there is at least one matching ad to form the local network;
publishing, by the mobile device, an ad with a first local network configuration to the overlay network via a Wireless Wide Area Network (WWAN) access point if no matching ads are determined; and
joining a local network according to a second local network configuration corresponding to one of the one or more matching ads if one or more matching ads are determined; and second means for storing program code executable by the first means.

18. A mobile device, comprising:
a memory comprising a local network formation component; and
a processor in communication with the memory and configured to execute the local network formation component to:
join an overlay network via an available connection;
retrieve from the overlay network at least one ad associated with forming a local network;
determine if there is at least one matching ad to form the local network;
publish, by the mobile device, an ad with a first local network configuration to the overlay network via a Wireless Wide Area Network (WWAN) access point if no matching ads are determined; and
join a local network according to a second local network configuration corresponding to one of the one or more matching ads if one or more matching ads are determined.

19. The mobile device of claim 18, wherein if no matching ads are determined, the processor is further configured to execute the local network formation component to periodically broadcast information including a name of the overlay network and a key corresponding to the published ad.

20. The mobile device of claim 19, wherein the processor is further configured to execute the local network formation component to establish a local network over a local area interface according to the first local network configuration based on a second mobile device detecting the broadcast.

21. The mobile device of claim 19, wherein the processor is further configured to execute the local network formation component to:
submit a new ad request to the overlay network for the resource identifier at a predetermined time period after an initial broadcasting of the beacon;
receive a response to the new ad request identifying a new ad corresponding to the resource; and
establish a local network over a local area interface based on the second local network configuration corresponding to the new ad.

22. The mobile device of claim 18, wherein if one or more matching ads are determined, then the processor is further configured to execute the local network formation component to:
determine if ad location information associated with each matching ad corresponds to location information of the mobile device to define a matching location;
if no matching location is found, then the processor is further configured to execute the local network formation component to:
activate a listening mode;
receive a broadcast beacon in the listening mode, wherein the broadcast beacon includes an overlay name and a key identifying an ad;
determine if the broadcast beacon matches to one of the matching ads based on the key; and
establish a local network over a local area interface based on the second local network configuration corresponding to the ad that matches the key corresponding to the broadcast beacon.

23. The mobile device of claim 18, wherein if a single matching ad is determined, then the processor is further configured to execute the local network formation component to:
determine if ad location information associated with the matching ad corresponds to location information of the mobile device to define a matching location; and
if a matching location is found, then the processor is further configured to execute the local network formation component to:
establish a local network over a local area interface based on the second local network configuration corresponding to the ad having the matching location information,.

24. The mobile device of claim 18, wherein if one or more matching ads are determined, then the processor is further configured to execute the local network formation component to:
determine if ad location information associated with each matching ad corresponds to location information of the mobile device to define a matching location; and
if a plurality of matching locations are found, then the processor is further configured to execute the local network formation component to:
select one of the ads having the matching location information according to a rule; and
establish a local network over a local area interface based on the second local network configuration corresponding to the selected one of the ads having the matching location information.

25. The mobile device of claim 24, wherein selecting one of the ads according to the rule further comprises choosing a respective ad having a latest advertised value.

26. The mobile device of claim 18, wherein at least one of the first local network configuration or the second local network configuration further comprises at least one of an SSID, a BSID, a channel, a location, and a key.

27. The mobile device of claim 18, wherein the ads are published using a known resource identifier.

28. The mobile device of claim 18, wherein the ads include location parameters associated with a corresponding local network configuration.

29. The mobile device of claim 18, wherein the ads are determined as matching when resource identifiers in the matching ads are not an exact match.

30. The mobile device of claim 18, wherein the local network includes a mobile device acting as a relay for at least one other mobile device within the local network.

31. The mobile device of claim 30, wherein the relay extends a communication range of the mobile devices within the local network.

* * * * *